United States Patent [19]
Saito et al.

[11] Patent Number: 5,184,393
[45] Date of Patent: Feb. 9, 1993

[54] METHOD OF MANUFACTURING FLYING MAGNETIC HEAD

[75] Inventors: Kazuhiro Saito; Nobuo Imazeki, both of Saitama, Japan

[73] Assignee: Nippon Mining Company, Limited, Tokyo, Japan

[21] Appl. No.: 781,478

[22] Filed: Oct. 17, 1991

[30] Foreign Application Priority Data

Nov. 30, 1990 [JP] Japan .................................. 2-336572
Mar. 26, 1991 [JP] Japan .................................. 3-84441

[51] Int. Cl.$^5$ .............................................. G11B 5/42
[52] U.S. Cl. .................................... 29/603; 360/122
[58] Field of Search ................. 29/603; 360/119.14, 360/122, 123

[56] References Cited
FOREIGN PATENT DOCUMENTS
2-240818  9/1990  Japan .

*Primary Examiner*—Carl E. Hall
*Attorney, Agent, or Firm*—Panitch Schwarze Jacobs & Nadel

[57] ABSTRACT

In a method of manufacturing a flying magnetic head, the following surfaces are mirror-finished: a bonding surface 18a of a core block 18, a surface 18b of the core block 18 which is on the opposite side of the bonding surface 18a, a surface 19a of a core block 19, and a bonding end surface 2a of a slider 2 formed of a non-magnetic material such as ceramics and having a rectangular sectional configuration. Then, high-melting-point bonding glass layers m are deposited on these surfaces by sputtering or the like. Afterwards, the core blocks 18 and 19 and the slider 2 are put together and simultaneously bonded with each other by heating under pressure through the bonding glass layers m, thereby forming a flying magnetic head block.

11 Claims, 7 Drawing Sheets

METHOD OF MANUFACTURING FLYING MAGNETIC HEAD

BACKGROUND OF THE INVENTION

1. Field of the Invention

The present invention relates to a method of manufacturing a flying magnetic head used in a magnetic disc drives and, in particular, to a method of manufacturing a flying magnetic head using a thin-film-laminated core as the head core (the head chip).

2. Description of the Related Art

FIGS. 8 and 9 show a so-called-composite-type flying magnetic head, which is generally used in a magnetic disc drives. This flying magnetic head is equipped with a slider 2 and a head core (a head chip) 1 and connected to the arm of the actuator of the drives body through a plate-spring suspension 3. The head core 1 consists of a ferrite core chip or an MIG-type core chip having a gap portion in which is formed a magnetic thin film of an Fe-Si-Al alloy (Sendust) or an amorphous magnetic material. This head core 1 is fitted into a groove 5 formed in an air-bearing-surface (hereinafter referred to simply as "ABS") portion 4 of the slider 2 and is secured therein by glass molding.

Generally, the slider 2 is formed of a non-magnetic ceramic material. Accordingly, the glass molding portion by means of which the head core 1 is joined to the slider 2, i.e., the molding glass M (FIG. 10), is softer than the head core 1 and the slider 2. As a result, this glass molding portion is liable to be recessed with respect to the other portions even in the stage of the final finish of the ABS portion 4. As is known in the art, it is very difficult to make the depth of this recess less than 100Å.

Such a recess is apt to allow deposit from the disc medium to gather therein due to CSS (contact start stop), with the result that the friction between the head and the disc increases, which leads to deterioration in durability. Since frictional force changes in proportion to the area involved, reducing the area of that portion of the molding glass M exposed on the ABS portion 4 would be very effective in attaining an improvement in terms of CSS characteristic.

However, in a core chip of the ferrite type or the MIG type, the width W of that portion of the head core which is exposed on the ABS portion (FIG. 9) corresponds to the track width. Accordingly, it is necessary to make exclusively the core tip portion in a thickness, for example, of 10 μm by machining, whereas the thickness T of the remaining head core portion has to be not less than 100 μm to secure the requisite level of handling strength. Thus, as shown in FIG. 10, the width of the exposed portion of the molding glass M, which corresponds to the difference w between the thickness W of the head-core tip portion and the entire thickness T of the head core portion, has to be as large as 90 μm or more, which constitutes a very serious problem.

Further, in a conventional composite-type flying magnetic head, in which the entire head core or the principal portion thereof consists of ferrite, the entire head core functions as a magnetic core. If, with such a flying magnetic head, a higher frequency flying to be dealt with, a reduction in inductance must be effected, so that -there is no choice but to form the head core in the smallest possible thickness T of approx. 100 μm to retain the requisite level of handling strength, thus attaining a reduction in inductance per number of turns. Accordingly, except for that portion of the head core which corresponds to the track width, which is only one tenth of the above thickness, the head core has to be filled with molding glass or the like. Thus, it is difficult to realize a structure in which the exposed portions on the ABS portion are restricted to the slider and core materials, which exhibit a satisfactory level of CSS characteristic.

With a view to solving the above problems, the present inventors directed their attention to a thin-film-laminated composite-type floating magnetic head, which uses a thin-film-laminated core as the head core (the head chip). Such a head core, which has recently come to be used in VCR and which helps to realize high-density recording and to attain a reduction in track width, is prepared by depositing on a substrate thin films of an Fe-Si-Al alloy (Sendust), an amorphous magnetic material, iron nitride, etc. Examples of a thin-film-laminated composite-type flying magnetic head are described in Japanese Patent Application No. 2-76365 and 2-204202, which were filed by the present applicant. As shown in FIGS. 11 and 12 of the present application, each of the flying magnetic heads of the above-mentioned patent applications is prepared by fitting a head core 1 into a given groove 5 in a ceramic slider 2, which is formed, for example, by cutting and grinding a unitary ceramic piece. The head core 1 thus fitted into the groove 5 is secured therein by glass molding.

With such a thin-film-laminated composite-type magnetic head, the track width is determined by the thickness of the magnetic alloy film 14. As shown in FIG. 11, this magnetic alloy film 14 is reinforced on either side by means of ceramic portions 11 and 16, whereby the thickness of the molding glass portions Ma, Mb and Mc, by means of which the head core 1 is bonded to the slider 2, can be substantially reduced. The thickness of these molding glass portions is reduced to 20 μm or less, or even to 10 μm or less. This helps to substantially reduce the exposed area on the ABS portion of the molding glass and to attain an improvement in CSS characteristic to a remarkable degree. Thus, it will be appreciated that according to the above-mentioned patent applications, a generally reliable composite head can be realized.

However, even in such a thin-film-laminated composite-type flying magnetic head, there is a demand for a further reduction in the exposed area of the molding glass on the ABS portion, i.e., a further improvement in terms of CSS characteristic. That is, the molding-glass portions Ma, Mb and Mc, by means of which the head core 1 is bonded to the slider 2, are softer than the head core 1 and the slider 2, and, even in the stage of the final finish of the ABS portion 4, these glass portions are more liable to be recessed as compared to the other portions. It is very difficult to make the depth of these recesses less than 100Å. As stated above, deposit from the disc medium is apt to gather in these recesses due to CSS (contact start stop), with the result that the friction between the head and the disc medium increases, which leads to deterioration in durability.

Further, as stated above, when preparing a conventional thin-film-laminated composite-type flying magnetic head, a head core 1 is fitted into a given groove 5 in a ceramic slider 2 formed by cutting and grinding a unitary ceramic piece, and is secured in the groove 5 by glass molding. The problem with this preparation method is that the operations of forming the groove 5 by machining, fitting the head core 1 into the groove 5, performing glass molding subsequent to the fitting, etc. are very complicated and demand skill, resulting in a rather poor operational effeciency.

To solve the above problems, a method of manufacturing a thin-film-laminated composite-type flying magnetic head has been proposed in a Japanese Patent Application (Japanese Patent Laid-Open No.2-240818) filed by Kansai Nichiden Kabushiki-Kaisha. According to the method proposed, the area of those material portions other than the slider material which are exposed on the ABS portion, can be substantially reduced.

In accordance with the method mentioned above, core blocks, each formed by depositing thin magnetic films of an Fe-Si-Al alloy on a non-magnetic substrate, are bonded with each other by glass bonding to form a magnetic head block, and this magnetic head block is bonded to a slider block by resin or glass bonding to form a core/slider assembly. Then, grooving is performed on this core/slider assembly, and then, cutting on the magnetic head block, thus preparing a flying magnetic head as shown in FIG. 13.

With this flying magnetic head, constructed as described above, the portions exposed on the ABS are L restricted to the following: a metal magnetic film 14' having a thickness corresponding to the track width; bonding layers for holding this metal magnetic film on either side; a gap material 21'; and an adhesion layer M' (consisting of resin or glass) for bonding the laminate-type magnetic head block 1' to the slider block 2'. Thus, the area of those material portions other than the slider material which are exposed on the ABS 4 is substantially reduced.

However, upon closer examination on this flying magnetic head, the present inventors -have found that the adhesion layer M', which bonds the laminate magnetic head block 1' to the slider block 2' and which consists of resin or glass, involves the generation of a deep recess during the machining of the ABS portion. Such a deep recess leads to a substantial deterioration in terms of CSS characteristic.

SUMMARY OF THE INVENTION

It is accordingly an object of this invention to provide a composite-type flying magnetic head using a thin-film-laminated core as the head core, wherein the formation of a deep recess in the slider ABS can be avoided so as to attain an improvement in CSS characteristic.

Another object of this invention is to provide a composite-type flying magnetic head using a thin-film-laminated core as the head core, wherein the gap depth, which has a significant influence on the characteristics of the magnetic head, can be directly observed.

Still another object of this invention is to provide a method of manufacturing a composite-type flying magnetic head using a thin-film-laminated core as the head core, wherein it is possible to produce a magnetic-thin-film-type flying magnetic head of the type described above with a high level of operational efficiency, wherein the magnetic thin film can be positioned appropriately in accordance with the track position, and wherein a multi-track magnetic head can be produced with ease.

The above objects are achieved by the composite-type flying-magnetic-head producing method of the present invention. In accordance with this invention, there is provide a method of manufacturing a flying magnetic head, comprising at least the steps of: (a) preparing a pair of core blocks each formed by depositing magnetic thin films on a substrate; (b) machining one side of one of said pair of core blocks and one end surface of a slider in such a manner that these surfaces are in conformity with each other substantially over their entire area; (c) bonding the pair of core blocks and the slider integrally with each other at the same time by heating under pressure through the high-melting-point glass layers, forming the pair of core blocks into a head core; and (d) performing grooving on the head core and the slider to form ABSs and mating a magnetic thin film of said head core with at least one of the ABSs on said slider. It is desirable that the softening point of the high-melting-point glass be 550 to 650° C., that the substrate and the slider be formed of a non-magnetic material or ferrite, and that the magnetic thin film be formed of an Fe-Si-Al alloy, an amorphous magnetic material or iron nitride.

In the method disclosed in Japanese- Patent Laid-Open No. 2-240818, the slider and the head core are bonded with each other after the preparation of the head core, so that the glass for bonding the slider and the head core with each other must have a softening point which is at least 100° C. lower than that of the glass used for the preparation of the head core so that the glass used for the preparation of the head core may not be softened and become loose.

A bonding glass having a high melting point is used for the gap bonding of an ordinary head and does not involve the formation of a deep recess during the machining of the head. A glass having a low melting point (a softening point of 450° C. or less), in contract, has a relatively low mechanical strength as compared to that of a high-melting point bonding glass. Accordingly, such a low-melting-point glass may cause partial abrasion depending upon the machining conditions, so that it cannot be used where a very strict CSS reliability is required, as in the case of the ABSs of a flying head.

In the manufacturing method of the present invention, in contrast, the bonding of the core blocks into the core head (the gap bonding) and the bonding of the core head with the slider are effected at the same time, so that the same high-melting-point bonding glass can be used for both bondings.

Thus, in accordance with the manufacturing method of the present invention, a high-melting-point bonding glass having a high level of mechanical strength is used, so that a flying magnetic head excelling in CSS characteristic can be obtained without involving the formation of a deep recess during the machining of the ABS portions.

DESCRIPTION OF THE PREFERRED EMBODIMENTS

The flying-magnetic-head manufacturing method of the present invention will now be described in more detail with reference to the accompanying drawings.

Figure 1:
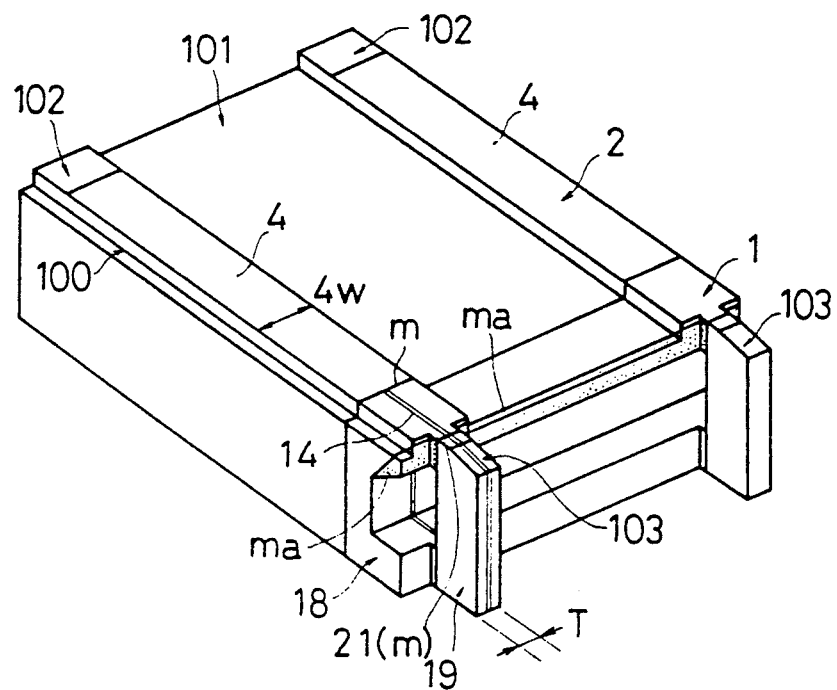
FIG. 1 is a perspective view of an embodiment of a composite-type flying magnetic head produced by the manufacturing method of the present invention.
Figure 2:
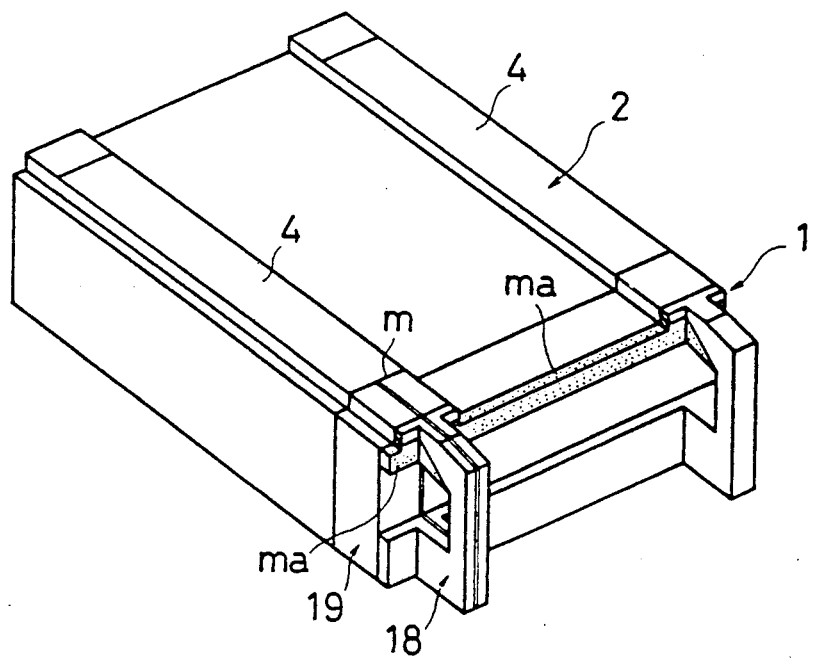
FIG. 2 is a perspective view of another embodiment of a composite-type flying magnetic head produced by the manufacturing method of the present invention.

FIGS. 1 and 2 show an embodiment of a composite-type flying magnetic head produced in accordance with the manufacturing method of this invention. As in the prior art, the flying magnetic head of this embodiment comprises a slider 2 and a head core (a head chip) 1, which are integrally bonded with each other. The slider 2, thus bonded with the head core 1, is connected to the actuator of the magnetic disc drives through a plate-spring suspension.

To describe it in more detail, the head core 1 is composed of a pair of core blocks 18 and 19, which are connected to each other by gap bonding. One of the surfaces of this head core 1 is bonded with substantially the entire area of one end surface of the slider 2 through a high-melting-point-glass layer m, simultaneously with the gap bonding of the pair of core blocks 18 and 19. A magnetic thin film 14 of the head core 1 is mated with at least one of the ABSs 4 of the slider 2. In the embodiment shown in FIG. 1, a C-shaped core 18 is bonded to the end surface (trailing side) of the slider 2, whereas, in the embodiment shown in FIG. 2, an I-shaped core 19 is bonded to the end surface (trailing side) of the slider 2.

Next, to be described with reference to FIGS. 3(A) through 3(F) will be an embodiment of a method of manufacturing a thin-film-laminated head core, which is used as the head core 1 and which is formed by depositing magnetic thin films on a substrate. The material of the magnetic thin film 14 consists of an Fe-si-Al magnetic alloy, an amorphous magnetic material, iron nitride, etc. In this embodiment, an Fe-Si-Al magnetic alloy is employed.

Figure 3A:
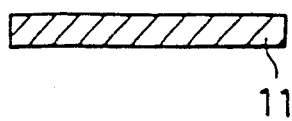
FIGS. 3(A) through 3(F) are process drawings illustrating a method of manufacturing a thin-film-laminated-type head core.

In this embodiment, a non-magnetic substrate 11 consisting of a ceramic material or the like is first prepared (FIG. 3(A)). An Fe-Si-Al alloy film 12 having a thickness ranging from 1 to 20 μm is deposited on this substrate 11 by sputtering. Then, a non-magnetic insulating film 13 having a thickness ranging from 0.03 to 0.5 μm is deposited on the Fe-Si-Al alloy film 12 by sputtering (FIG. 3(B)). The material of the non-magnetic insulating film 13 may consist of $SiO_2$, $Al_2O_3$, etc.

Figure 3D:
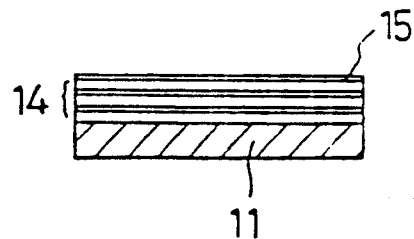
Figure 3B:
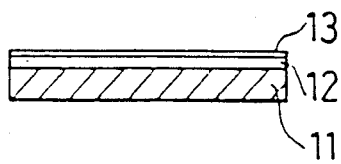
Figure 3E:
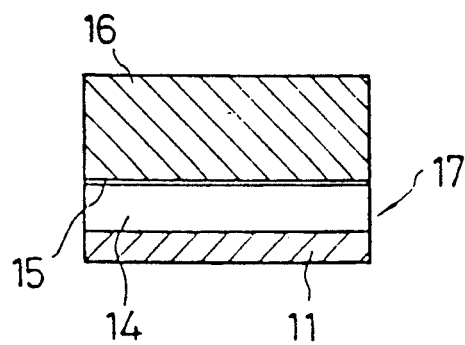
Figure 3C:
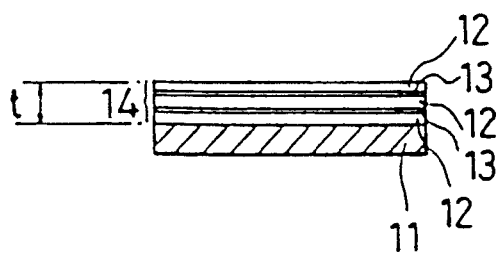
Figure 3F:
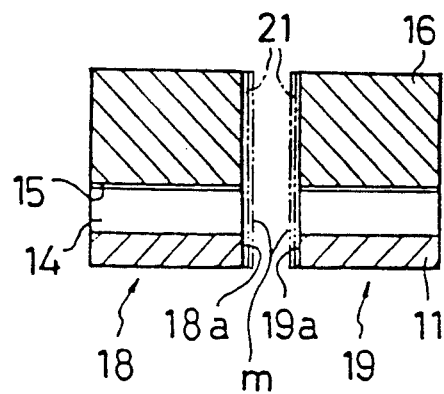

By repeating the above processes, a desired number of Fe-Si-Al alloy films 12 and of non-magnetic insulating films 13 are laminated, thereby forming on the substrate 11 a magnetic alloy thin film 14 having a film thickness t, as shown in FIG. 3(C).

Subsequently, a high-melting-point glass bonding layer 15 having a softening point, for example, of 650° C. is deposited on the magnetic alloy thin film 14 by sputtering or the like in a film thickness of 0.05 to 1.0 μm (FIG. 3(D)). Further, a non-magnetic substrate 16, i.e., the other substrate, which is formed of the same material as the substrate 11, is bonded to the bonding glass layer 15, thus forming a stacked magnetic core block 17 (FIG. 3(E)). The bonding glass layer 15 preferably consists of an $SiO_2$-$Al_2O_3$-$Na_2O$-type glass or an $SiO_2$-$B_2O_3$-$Na_2O$-type glass.

The core block 17, prepared as described above, is sliced, as shown in FIG. 3(F), in the stacking direction, thus forming a pair of core blocks 18 and 19.

Figure 4:
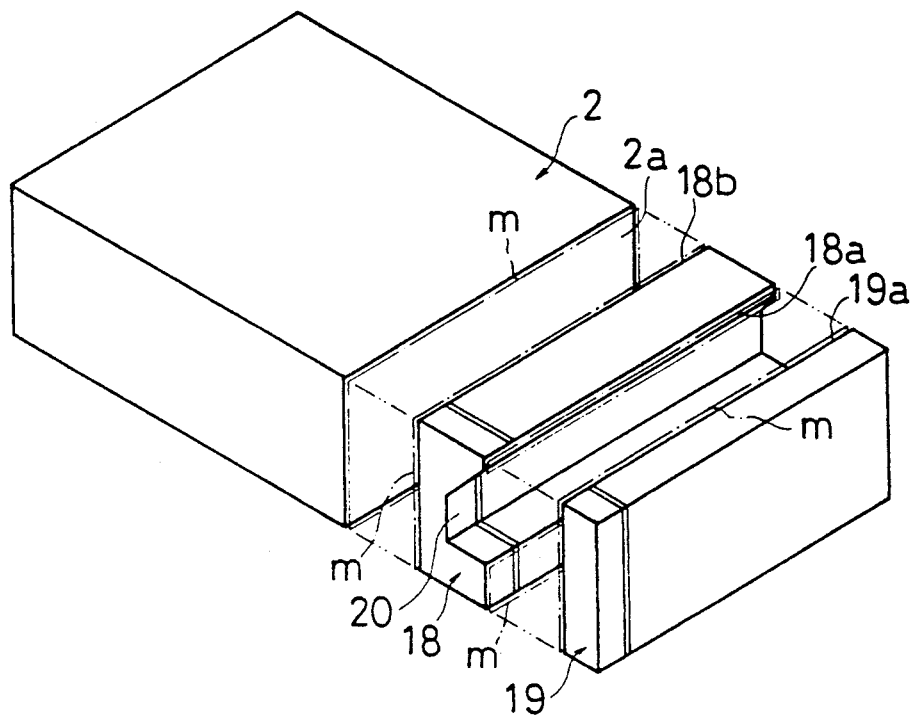
FIG. 4 is a perspective view illustrating how a slider and a head core are bonded with each other.

Subsequently, as shown in FIG. 4, a wiring groove 20 is formed in at least one of the core blocks (the core block 18, in this embodiment). Afterwards, the respective bonding surfaces 18a and 19a of the core blocks 18 and 19 are polished, depositing thereon non-magnetic gap spacers 21 consisting of $SiO_2$ or the like, by sputtering. Then, bonding glass layers m are deposited on the gap spacers 21 by sputtering, etc. (FIG. 3(F)). In the case where no gap spacers 21 are deposited, these bonding glass layers m function as a spacer gap material.

The manufacturing method of the present invention differs from that of Japanese Patent Laid-Open No. 2-240818 in that the core blocks 18 and 19 are not bonded with each other in this manufacturing stage. As shown in FIG. 4, also polished are a surface 18b of the core block 18, which is the surface on the opposite side of the bonding surface 18a, and the bonding end surface 2a of the slider 2, which is formed of a non-magnetic material such as ceramics and which has a rectangular sectional configuration. Bonding glass layers m are also deposited on these surfaces by sputtering or the like.

Figure 5:
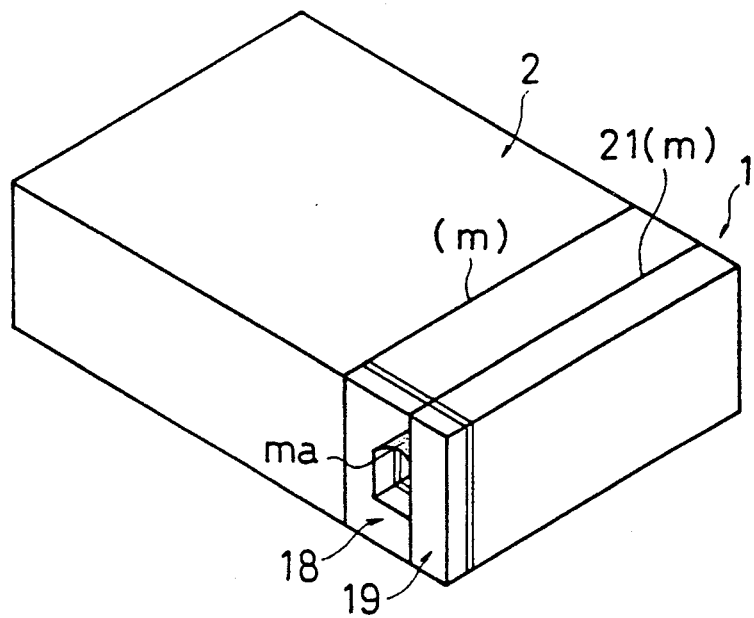
FIG. 5 is a perspective view of a magnetic head block formed by bonding a slider and a head core with each other.

Afterwards, the two core blocks 18 and 19 and the slider 2 are put together through the bonding glass layers m and are simultaneously bonded with each other by heating to form a flying magnetic head block structured as shown in FIG. 5. The thickness of the glass layers m on the head core 1 and the slider 2 may be approximately the same as the gap length to be prepared, for example, 0.1 to 0.7 μm.

The apex portion of the core blocks 18 and 19 is filled with apex glass $m_a$ in order to prevent breakage during the machining performed afterwards (FIG. 5).

Thus, in accordance with the manufacturing method of the present invention, the formation of the gap 21 in the head core 1 and the bonding of the head core 1 with the slider 2 are achieved at the same time, and the bonding of the head core 1 with the slider 2 can be effected by using a bonding glass layer m having a melting point higher than that of the glass layer M in the prior art.

Subsequently, as shown in FIGS. 1 and 2, an edge groove 100 and a central groove 101 are formed on the slider 2, thus forming ABSs 4 on the slider 2, to which the head core 1 has been joined as describe above. Usually, the width of the groove 100 is around 100 μm and the depth thereof as measured from the ABSs 4 is 150 μm or less. The width 4W of the ABSs ranges from 200 to 700 μm. Further, the front and rear portions of the ABSs 4 are formed as slopes 102 and 103, which constitute leading and trailing ends.

In the embodiment shown in FIG. 1, that magnetic head block which is not bonded with the slider 2 can be removed except for head core portions having a thickness T, which are left on the C-shaped core 18. This measure is taken with a view to facilitating the winding. In the embodiment shown in FIG. 2, the C-shaped core with a winding groove formed thereon can be removed except for a part thereof which is on the side nearer to the magnetic gap, thus forming head core portions having a thickness T.

Figure 9:
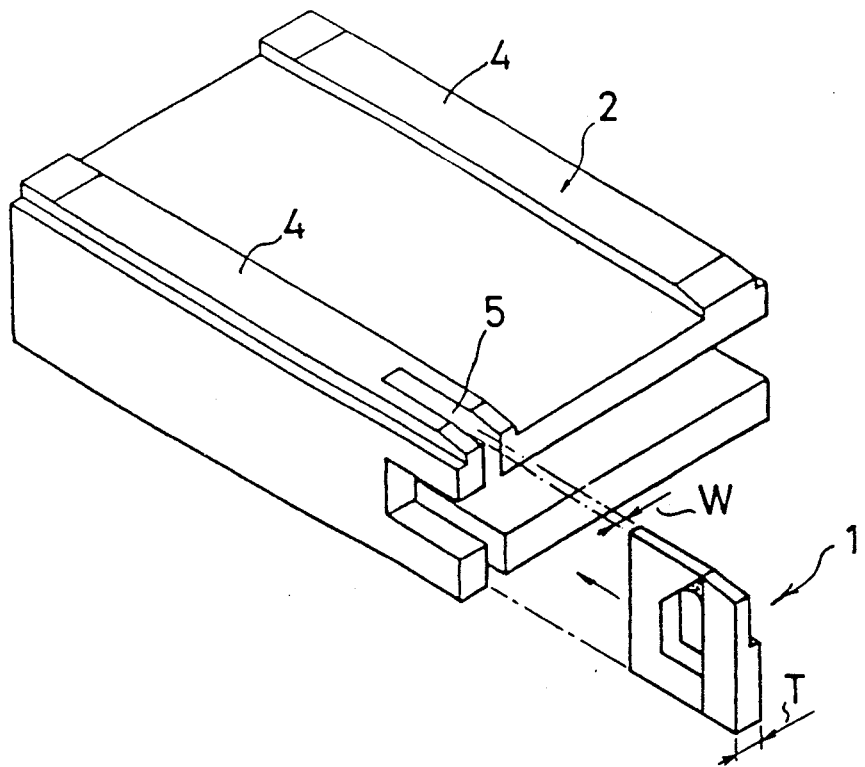
FIG. 9 is an exploded perspective view of the conventional composite-type ferrite flying magnetic head.
Figure 10:
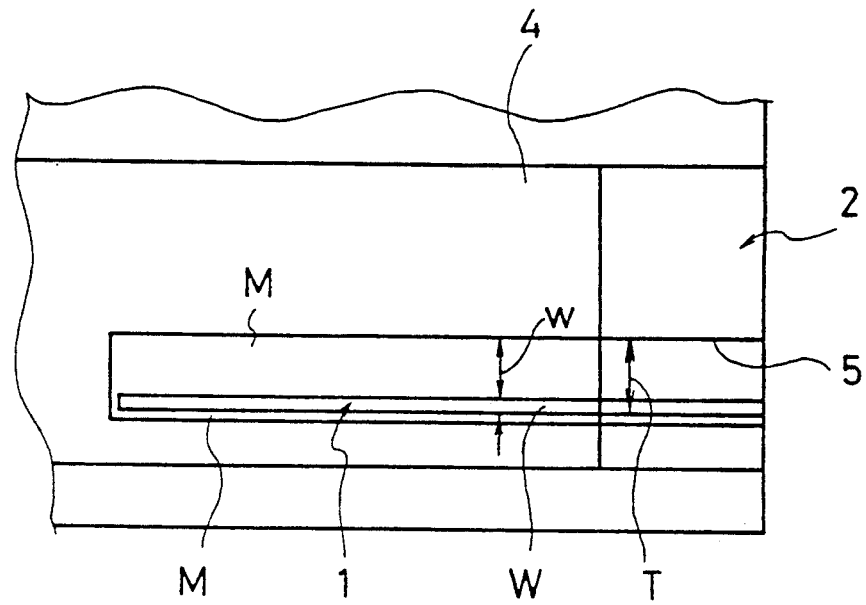
FIG. 10 is a plan view illustrating how the glass molding is effected in the conventional composite-type ferrite flying magnetic head.
Figure 11:
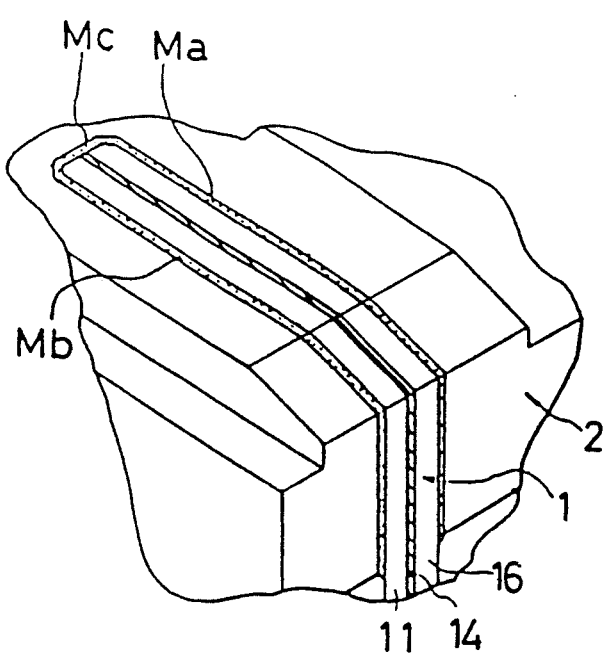
FIG. 11 is a partial enlarged perspective view of a thin-film-laminated composite-type flying magnetic head as proposed in the prior art.
Figure 12:
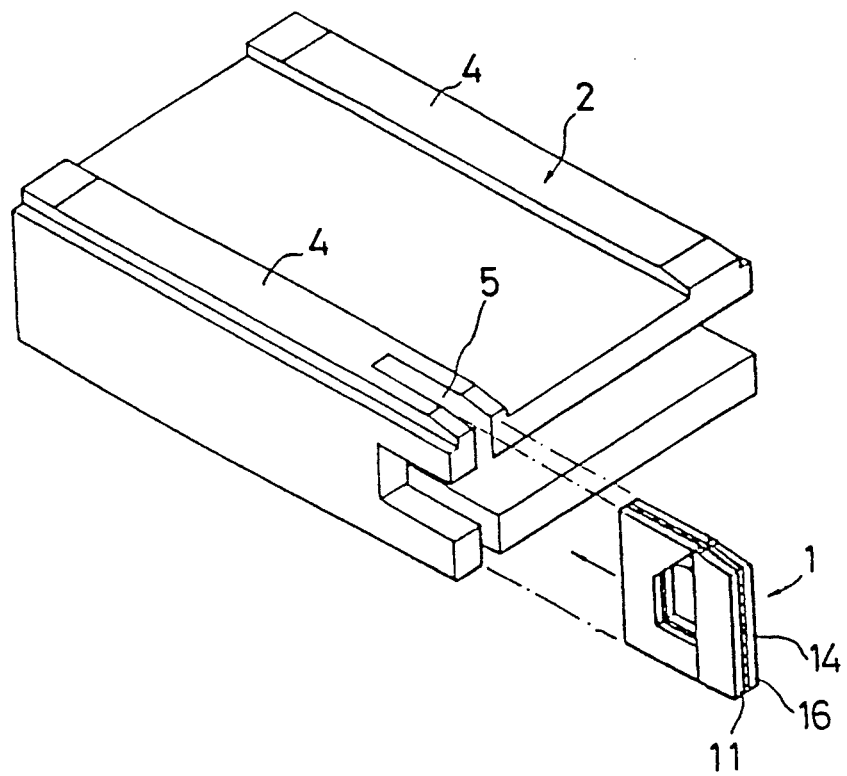
FIG. 12 is an exploded perspective view of the thin-film-laminated composite-type flying magnetic head as proposed in the prior art.

As will be appreciated from FIG. 1, in a flying magnetic head produced in accordance with the present invention, the thickness of the bonding layer between the slider 2 and the head core 1 is in the range from 0.1 to 0.7 $\mu$m, with its width corresponding to the width of the ABSs 4, i.e., 4W. Accordingly, the area of the exposed portion of this glass layer m can be 0.002 mm$^2$ or less. This value corresponds to 1/45 or less of the minimum area of 0.09 mm$^2$ that can be attained with the ferrite-type or the MIG-composite-type conventional flying magnetic head shown in FIG. 9, and to 1/10 or less of the minimum area of 0.02 mm$^2$ that can be attained with the thin-film-laminated composite-type flying magnetic head shown in FIGS. 11 and 12.

In the thickness of the bonding layer between the slider 2 and the head core 1 is less than 0.1 $\mu$m, the resulting adhesion strength is rather-low. If, on the other hand, the thickness of the bonding layer is more than 0.7 $\mu$m, the resulting recessed groove width is excessively large even for a high-melting-point bonding glass, so that even a slight partial abrasion will result in the generation of a recess as deep as 100 Å or more to cause deterioration in CSS characteristic. Thus, the thickness range is determined as 0.1 to 0.7 $\mu$m.

Figure 13:
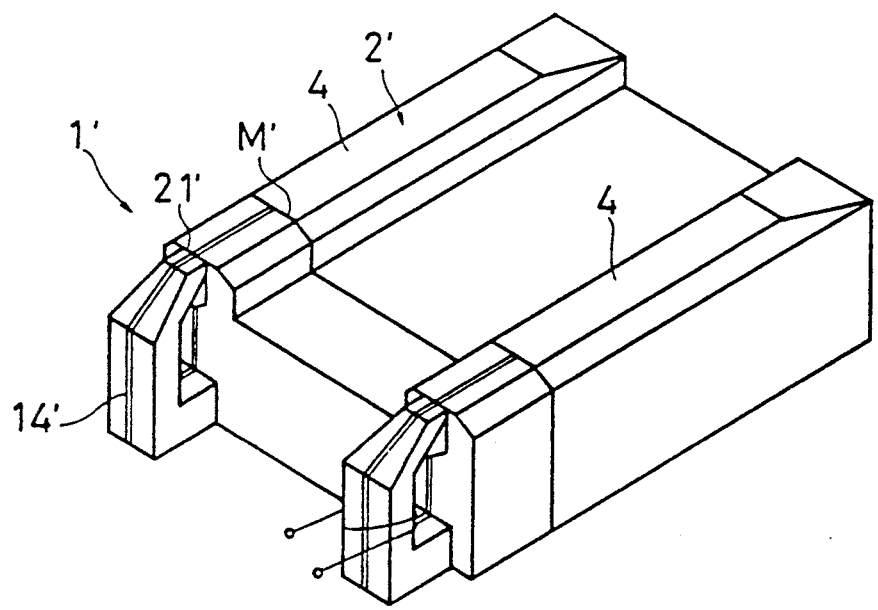
FIG. 13 is a perspective view of another thin-film-laminated composite-type flying magnetic head as proposed in the prior art.

Further, it should be noted that, in accordance with this invention, the core blocks 18 and 19 and the slider 2 are simultaneously bonded with each other by means of high-melting-point bonding glass layers m, whose softening point is higher than that of the bonding glass M' in the prior art as described above, which is 450° C. Specifically, the softening point of the bonding glass m of the present invention is 550° C. or more, preferably in the range from 550° C. to 650° C. Accordingly, the bonding glass layer m, which bonds the head core 1 with the slider 2, is considerably harder than the adhesion layer of resin or glass which is used in the prior-art method which is disclosed in Japanese Patent Laid-Open No. 2-240818 and which has been illustrated with reference to FIG. 13. Thus, the glass layer portion m of this invention does not involve the generation of any recess during the machining of the ABSs, thus attaining an improvement in terms of CSS characteristic.

Further, as will be appreciated from FIG. 1, in accordance with this invention, the apex portion of the apex glass $m_a$ allows observation, so that the gap depth, which constitutes a very important factor determining the magnetic head performance, can be observed directly.

By adopting the method illustrated in FIG. 6, the magnetic head of the present invention, described with reference to the above embodiments, can be mass-produced with a very high efficiency.

Figure 6:
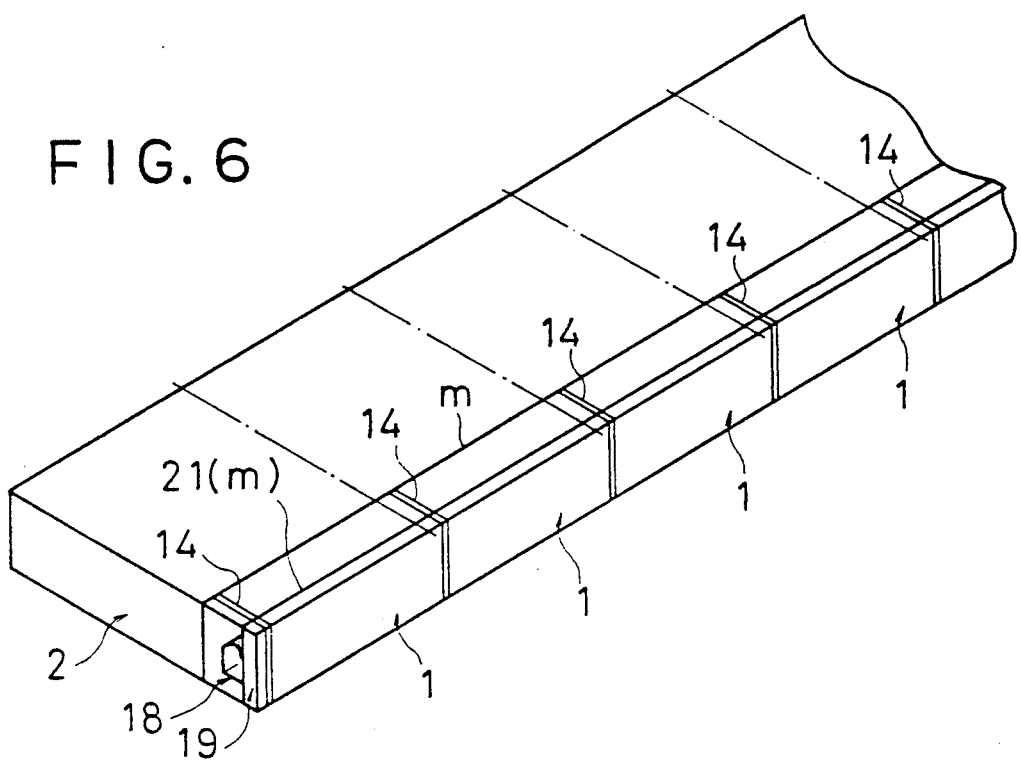
FIG. 6 is a perspective view illustrating another embodiment of the manufacturing method of the present invention.

In this method, a plurality of magnetic core blocks 17, each prepared in a conventional way as shown in FIG. 3(E) are stacked together to form a stacked core block, which is sliced, as shown in FIG. 6, thicknesswise in the stacking direction, performing grooving thereon as needed so as to form a winding slot, etc. In this way, a pair of bar-like core blocks 18 and 19 are obtained, which are to be formed into C-shaped and I-shaped cores.

Subsequently, the joining surfaces of the bar-like core blocks 18 and 19 and that of a bar-like slider 2 are polished, forming bonding glass layers m thereon. Then, they are simultaneously bonded together, as shown in FIG. 6. Afterwards, the resulting bar-like body is sliced, as indicated by the dashed lines, into a plurality of sliders 2 each equipped with a head core. By changing the cutting positions, the track position on each slider 2 can be determined arbitrarily.

Afterwards, desired machining operations, such as grooving, are performed on each slider 2 and the associated head core 1, as described above, thus preparing flying magnetic heads as described with reference to the above embodiments.

Figure 7:
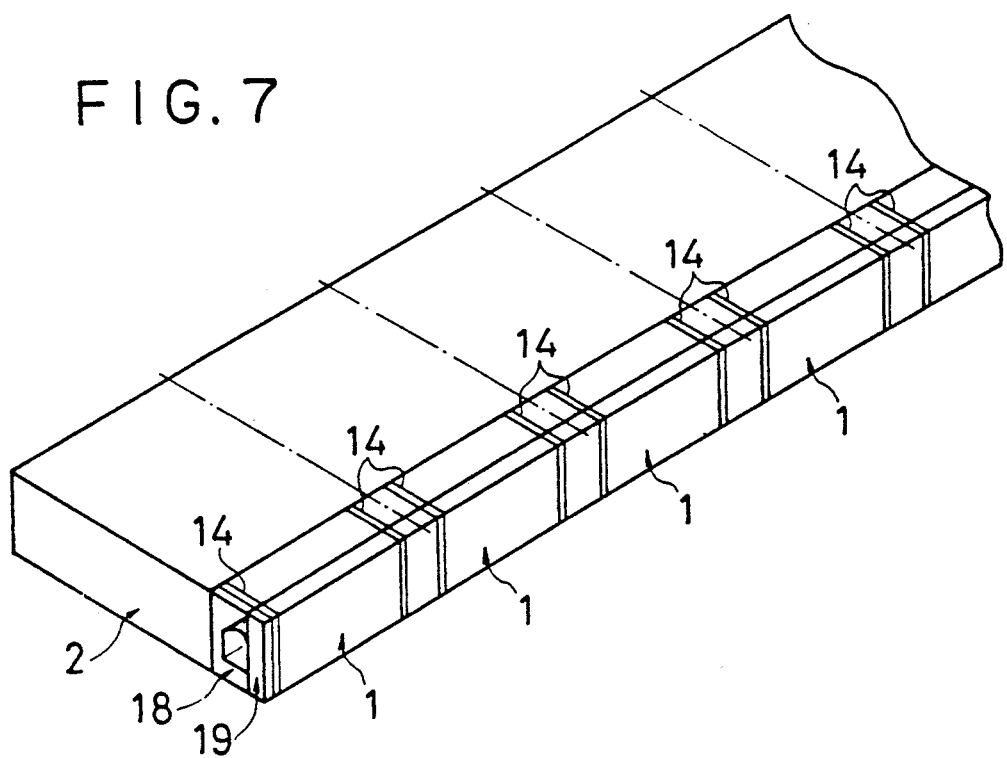
FIG. 7 is a perspective view illustrating still another embodiment of the manufacturing method of the present invention.
Figure 8:
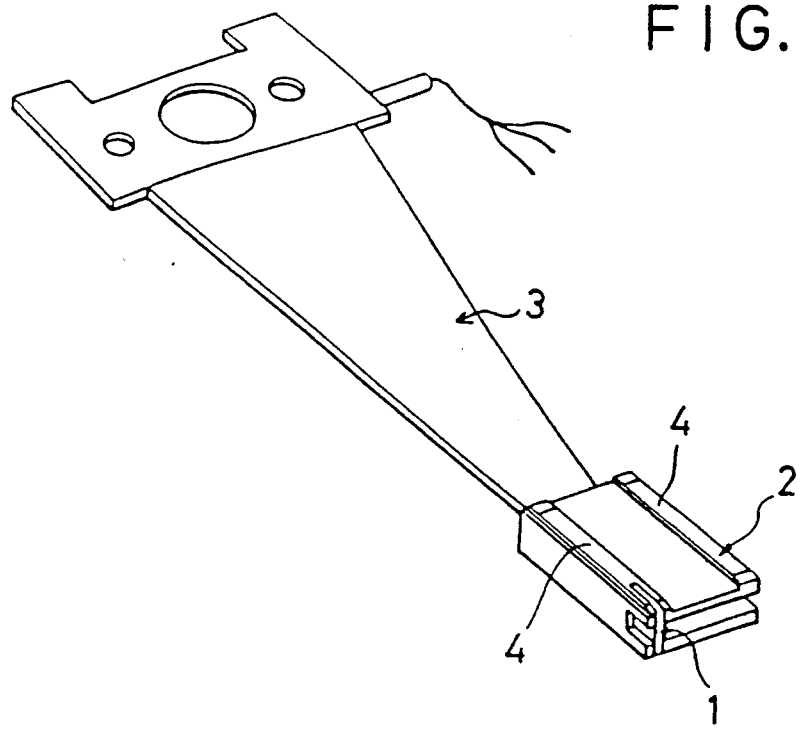
FIG. 8 is a perspective view of a conventional composite-type ferrite flying magnetic head.

While in the above embodiments the magnetic thin film 14 is only provided on one of the ABSs 4 of the slider 2, it is also possible, as shown in FIG. 7, to design the head core 1 such that it has two magnetic thin films 14, which re respectively positioned on each of the two ABSs 4. This can be realized by changing the mode of stacking for the magnetic core blocks 17. Apart from this, various modifications are possible. In accordance with this invention, a multi-track flying magnetic head can be produced very easily.

While in the above-described embodiments the substrates 11 and 16 of the head core 1 and the slider 2 are formed of a non-magnetic material such as ceramics, they may also be formed of some other material, e.g., fertrite. Further, while in the embodiments described above the magnetic thin film 14 of the head core 1 is formed of an Fe-Si-Al magnetic alloy, it may also be formed of an amorphous magnetic material or iron nitride, as stated above.

In the following, the present invention will be described with reference to specific examples.

EXAMPLE 1

On a non-magnetic substrate 11 consisting of a non-magnetic ceramic material containing CoO-NiO as the main constituent, Fe-Si-Al alloy films 12 and non-magnetic insulating films 13 are alternately laminated by sputtering, in accordance with the procedures illustrated with reference to FIGS. 3(A) through 3(C), thereby forming a magnetic alloy thin film 14. In this example, $SiO_2$ was used as the material of the non-magnetic insulating films 13. The thickness of the magnetic alloy thin film 14 was 20 $\mu$m in correspondence with the track width.

Then, a bonding glass layer 15 having a high melting point (a softening point of 650° C.) was deposited on the magnetic alloy thin film 14 by sputtering in a film thickness of 0.25 $\mu$m. Further, a bonding glass layer 15 having a high melting point (a softening point of 650° C.) was also deposited on another non-magnetic substrate 16 formed of the same material as the substrate 11, by sputtering in a thickness of 0.25 $\mu$m. The substrate 16, thus equipped with a bonding glass layer, was superimposed on the magnetic alloy film 14 and stacked under pressure thereto at a temperature of 700° C., thereby forming a magnetic core block 17. The material of the bonding glass layers 15 used was an $SiO_2$-$Al_2O_3$-$Na_2O$-type glass.

Subsequently, the magnetic core block 17, prepared as described above, was sliced in the direction of the stacking thickness, thereby forming a pair of core blocks 18 and 19. A groove constituting a winding window was formed on the sliced surface of the core block 18 (the surface 18a of FIG. 4). Afterwareds, this surface 18a and the surface on the opposite side (the surface 18b of FIG. 4) were mirror-finished. The sliced surface of the core block 19 (the surface 19a of FIG. 4) was also mirror-finished.

Apart from this, a non-magnetic ceramic substrate containing CoO-NiO as the main constituent was prepared as the slider 2 on which the main ABS portions are to be formed, and a surface of this substrate (the surface 2a of FIG. 4) was mirror-finished.

Bonding glass layers m having a high melting point (a softening point of 550° C.) were deposited on the surfaces 18a and 18b of the core block 18, the surface 19a of the core block 19, and the surface 2a of the slider 2. This embodiment was so designed that the bonding glass layers m also functioned as a gap material. The thickness of the bonding glass layers m was 0.25 μm.

Subsequently, the core blocks 18 and 19 and the slider 2 were simultaneously bonded with each other by heating under pressure at a temperature of 600° C., thereby forming a flying magnetic head block structured as shown in FIG. 5. The thickness of the bonding glass layers m between the head core 1 and the slider 2 was 0.25 82 m, which was approximately the same as the gap length.

The apex portion of the core blocks 18 and 19 was filled with apex glass $m_a$ of a generally used type with a view to preventing breakage during the machining to be performed afterwards. Then, as shown in FIG. 1, an edge groove 100 and a central groove 101 were formed, defining ABSs 4 having a width of 500 μm. The leading and trailing portions of the ABSs 4 were obliquely lapped or ground to be formed as sloped surfaces 102 and 103.

Further, as shown in FIG. 1, the magnetic head block was formed into head core sections having a width (T) of 200 μm, with the remaining portion of the magnetic head block being removed.

The recesses between the different material portions in the ABS bonded portions of the flying magnetic head, prepared as described above, were evaluated by means of a stylus-type surface profiler. The results of the evaluation showed that the recess depth was less than 100 Å in all of the portions examined, i.e., the non-magnetic substrate, the magnetic alloy film, the high-melting-point-glass bonding layers, and the gap portions.

Further, this flying magnetic head was examined for the CSS characteristic. No rapid increase in the frictional force was to be observed even after repeating the test 20,000 times. After repeating the test 100,000 times, the ABSs exhibited no recess where deposit would gather, with no flaw being observed on the recording medium surface.

COMPARISON EXAMPLE 1

A glass layers having a low melting point (a softening point of 450° C.) was deposited on the surface 18b of the core block 18 and the surface 19a of the slider 2, by sputtering in a thickness of 0.3 μm. Afterwards, the core block and the slider were bonded with each other by heating under pressure at a temperature of 500° C., thereby forming a flying magnetic head block. The thickness of the low-melting-point-glass layer between the head core 1 and the slider 2 was 0.25 μm, which approximately corresponded to the gap length.

Afterwards, this flying magnetic head block was machined in the same manner as in Example 1, forming ABS s and a head core.

The recesses between the difference material portions in the ABS joint portions of the flying magnetic head, prepared as described above, were evaluated by means of a stylus-type surface profiler. The results of the evaluation showed that the recess depth was less than 100Å in all of the portions examined, i.e., the non-magnetic substrate, the magnetic alloy film, the high-melting-point-glass bonding layer, and in the gap portions. The low-melting-point-glass layer, however, indicated, during the washing in the final finish stage, the formation of a recess having a depth of 700 to 1500 Å.

Further, this flying magnetic head was examined for the CSS characteristic. After repeating the test 20,000 times, the coefficient of friction was in excess of 0.5, so the examination was stopped and the ABSs were examined. The examination showed that the recess in the low-melting-point-glass bonding layer was filled with deposit and raised as compared to the ABSs.

Thus, in accordance with the flying magnetic head manufacturing method of the present invention described above, no low-melting-point molding glass is exposed on the ABSs, making it possible to attain a drastic improvement in terms of CSS characteristic. Further, a flying magnetic head manufactured in accordance with the present invention has the advantage that the gap depth, which has a significant influence on the magnetic head characteristics, can be directly observed. In addition, the manufacturing method of the present invention makes it possible to produce such magnetic-thin-film-type flying magnetic heads with a high level of operational efficiency, and to position the magnetic film in accordance with the track position, ad further, to manufacture a multi-track magnetic head with ease.

What is claimed is:

1. A method of manufacturing a flying magnetic head, comprising at least the steps of:
   (a) preparing a pair of core blocks each formed by depositing magnetic thin films on a substrate;
   (b) machining one side surface of one of said pair of core blocks and one end surface of a slider in such a manner that these surfaces are in conformity with each other substantially over their entire area;
   (c) bonding said pair of core blocks and said slider integrally with each other at the same time by heating under pressure through the intermediation of high-melting-point glass layers, forming said pair of core blocks into a head core; and
   (d) performing grooving on said head core and said slider to form ABSs and mating a magnetic thin film of said head core with at least one of the ABSs on said slider.

2. A method of manufacturing a flying magnetic head as claimed in claim 1, wherein the softening point of said high-melting-point glass layers ranges from 550 to 650° C.

3. A method of manufacturing a flying magnetic head as claimed in claim 1, wherein the thickness of said high-melting-point glass layers ranges from 0.1 to 0.7 μm.

4. A method of manufacturing a flying magnetic head as claimed in claim 1, wherein said substrate and said slider are formed of a non-magnetic material or ferrite.

5. A method of manufacturing a flying magnetic head as claimed in claim 1, wherein said magnetic thin film is formed of an Fe-Si-Al alloy, an amorphous magnetic material, or iron nitride.

6. A method of manufacturing a flying magnetic head as claimed in claim 2, wherein the thickness of said high-melting-point glass layers ranges from 0.1 to 0.7 μm.

7. A method of manufacturing a flying magnetic head as claimed in claim 2, wherein said substrate and said slider are formed of a non-magnetic material or ferrite.

8. A method of manufacturing a flying magnetic head as claimed in claim 3, wherein said substrate and said slider are formed of a non-magnetic material or ferrite.

9. A method of manufacturing a flying magnetic head as claimed in claim 2, wherein said magnetic thin film is formed of an Fe-Si-Al alloy, an amorphous magnetic material, or iron nitride.

10. A method of manufacturing a flying magnetic head as claimed in claim 3, wherein said magnetic thin film is formed of an Fe-Si-Al alloy, an amorphous magnetic material, or iron nitride.

11. A method of manufacturing a flying magnetic head as claimed in claim 4, wherein said magnetic thin film is formed of an Fe-Si-Al alloy, an amorphous magnetic material, or iron nitride.

* * * * *